United States Patent [19]

Nagano

[11] Patent Number: 5,379,665

[45] Date of Patent: Jan. 10, 1995

[54] BICYCLE PEDAL

[75] Inventor: Masashi Nagano, Izumi, Japan

[73] Assignee: Shimano Inc., Osaka, Japan

[21] Appl. No.: 893,544

[22] Filed: Jun. 4, 1992

[30] Foreign Application Priority Data

Jun. 19, 1991 [JP] Japan .................. 3-46173[U]

[51] Int. Cl.⁶ .................. G05G 1/14; F16C 13/00
[52] U.S. Cl. .................. 74/594.4; 74/534.1; 384/545; 384/512
[58] Field of Search .................. 74/594.4, 594.6, 594.5, 74/594.1, 594.2; 384/545, 512, 474, 558

[56] References Cited

U.S. PATENT DOCUMENTS

| | | | |
|---|---|---|---|
| 3,760,653 | 9/1973 | Hagenah | 74/594.4 |
| 4,398,434 | 8/1983 | Kimura | 74/594.4 |
| 4,825,719 | 5/1989 | Romano | 74/594.1 X |
| 4,838,115 | 6/1989 | Nagano | 74/594.5 X |
| 4,873,890 | 10/1989 | Nagano | 74/594.4 |
| 5,207,118 | 5/1993 | Chen | 384/474 X |

FOREIGN PATENT DOCUMENTS

| | | | |
|---|---|---|---|
| 2591989 | 6/1987 | France | 74/594.4 |
| 2593134 | 7/1987 | France | 74/594.4 |
| 2612483 | 9/1988 | France | 74/594.4 |
| 2614596 | 11/1988 | France | 74/594.4 |
| 2661651 | 11/1991 | France | 74/594.4 |
| 278110 | 4/1990 | German Dem. Rep. | 74/594.4 |
| 60-111790 | 7/1985 | Japan | 74/594.4 |
| 2-44630 | 7/1987 | Japan | 74/594.4 |

Primary Examiner—Vinh T. Luong
Attorney, Agent, or Firm—Dickstein, Shapiro & Morin

[57] ABSTRACT

A bicycle pedal for attaching to a crank arm having a pedal shaft including an attachment portion formed at one end thereof and attached to the crank arm, the pedal shaft defining a small diameter portion formed adjacent the other end thereof and having a smaller diameter than the attachment portion, and a first and a second ball bearings arranged in a region of the small diameter portion and spaced apart from each other axially of the pedal shaft. A needle bearing is disposed adjacent the ball bearings, and a pedal body is rotatably supported on the small diameter portion through the first and second ball bearings and the needle bearing. The pedal body defines at least one tread on a surface thereof. The needle bearing may be disposed between the first ball bearing and second ball bearing, or may be disposed closer than the first and second ball bearings to the crank arm or closer than the first and second ball bearings to an extreme end of the pedal shaft.

3 Claims, 4 Drawing Sheets

BICYCLE PEDAL

BACKGROUND OF THE INVENTION

1. Field of the Invention

The present invention relates to a bicycle pedal having a pedal body rotatably supported through bearings on a pedal shaft attached to a crank arm.

2. Description of the Related Art

A known example of bicycle pedals as noted above is disclosed in Japanese Utility Model Publication No. 1990-44630. In the known construction, the pedal shaft includes a distal portion having a smaller diameter than a proximal portion attached to the crank arm. A pair of ball bearings are mounted between the pedal body and the small diameter distal portion of the pedal shaft.

In the prior construction, since the pedal shaft is supported in a cantilever mode, the proximal portion of the pedal shaft is formed to have a large diameter to secure sufficient strength against a strong bending moment. The distal portion of the pedal shaft is free from a strong bending moment, and may therefore have a small diameter for accommodating the pair of ball bearings axially spaced from each other. With the pedal body supported through the ball bearings mounted on the small diameter portion, the prior construction avoids the pedal having an excessive thickness as a whole.

According to this prior construction, the pedal body is rotatably supported through only the pair of ball bearings. The pedal body, which is trodden directly by the cyclist's foot, and the pedal shaft are in point contact with the bearing balls. Consequently, the load of the treading force concentrates on positions of the point contact. Such positions tend to wear quickly, to impair durability of the pedal construction. The wear may result in displacement of the balls axially of the pedal shaft, whereby chattering occurs between the pedal shaft and pedal body to obstruct a smooth pedaling action.

SUMMARY OF THE INVENTION

The object of the present invention is to eliminate the disadvantage of the prior art noted above, and provide an improved bicycle pedal for attaching to a crank arm. Such a pedal has a pedal shaft including an attachment portion formed at one end thereof and attached to the crank arm, the pedal shaft defining a small diameter portion formed adjacent the other end thereof and having a smaller diameter than the attachment portion, and a first and a second ball bearings arranged in a region of the small diameter portion and spaced apart from each other axially of the pedal shaft. The pedal may have a reduced axial length too.

The above object is fulfilled, according to the present invention, by a bicycle pedal comprising a needle bearing disposed adjacent the ball bearings, and a pedal body rotatably supported on the small diameter portion through the first and second ball bearings and the needle bearing, the pedal body defining at least one tread on a surface thereof.

In the above construction, the pair of ball bearings receive part of the treading force transmitted through the pedal body, and the respective ball bearings effectively prevent the pedal body from moving outwardly and inwardly along the axis of the pedal shaft. The needle bearing also receives part of the treading force transmitted through the pedal body, and rotatably supports the pedal body through line contact. Consequently, this construction produces less right and left chattering due to wear of portions of sliding contact than in the prior art.

Even where the center of pedaling load acts on the outward ball bearing or a position further outward of this ball bearing, the needle bearing receiving part of the load alleviates wear of the ball bearing. Consequently, the center of the load may be allowed to lie more outwardly than in the prior art which places the center of the pedaling load between the inner and outer ball bearings to prolong life of the ball bearings. This construction allows the outward ball bearing to be relocated inwardly, thereby reducing the axial length of the pedal.

Thus, the present invention allows the pedal body to have a reduced inward thickness while securing a sufficient strength of the pedal shaft. The outward thickness of the pedal body which is determined on the basis of the inward thickness may also be reduced. The tread may be formed on the pedal body close to the crank arm to secure a large road clearance, thereby to provide the advantage of transmitting the treading force to the pedal shaft with high efficiency. In addition, the pair of ball bearings enable reliable position setting of the pedal body axially of the pedal shaft, while the needle bearing reduces the possibility of right and left chattering due to wear of the bearing region. This construction assures a constant pedaling touch over a long period.

Other features and advantages of the present invention will be apparent from the following description of the preferred embodiments taken with reference to the drawings.

DETAILED DESCRIPTION OF THE PREFERRED EMBODIMENTS

Embodiments of the present invention will be described with reference to the drawings.

Figure 1:
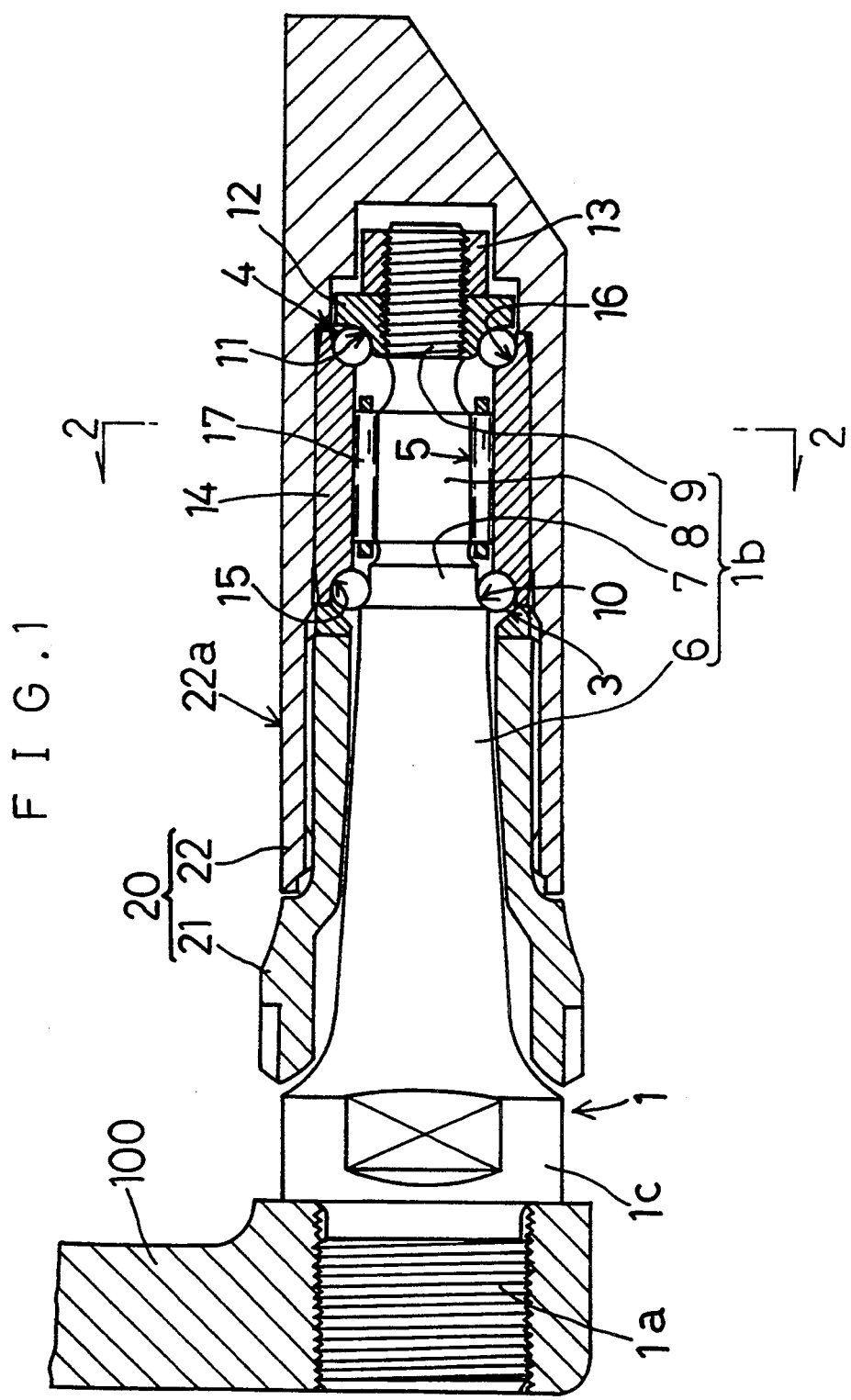
FIG. 1 is a sectional view of a bicycle pedal in a first embodiment of the present invention.

FIG. 1 shows a bicycle pedal having a pedal shaft 1 attached in a cantilever mode to a free end of a crank arm 100 of a bicycle crankset. The pedal shaft 1 rotatably supports a pedal body 20 defining a tread 22a.

The pedal shaft 1 includes a threaded attaching portion 1a for attaching to the crank arm 100, a shank portion 1b aligned with the attaching portion 1a and extending axially of the pedal shaft 1, and a turn flange 1c having an angular section and disposed between the attaching portion 1a and shank portion 1b. The shank portion 1b includes a distal region having a smaller diameter than the attaching portion 1a. A bearing device is mounted between the small diameter region and the pedal body 20 opposed thereto for rotatably supporting the pedal body 20.

Figure 2:
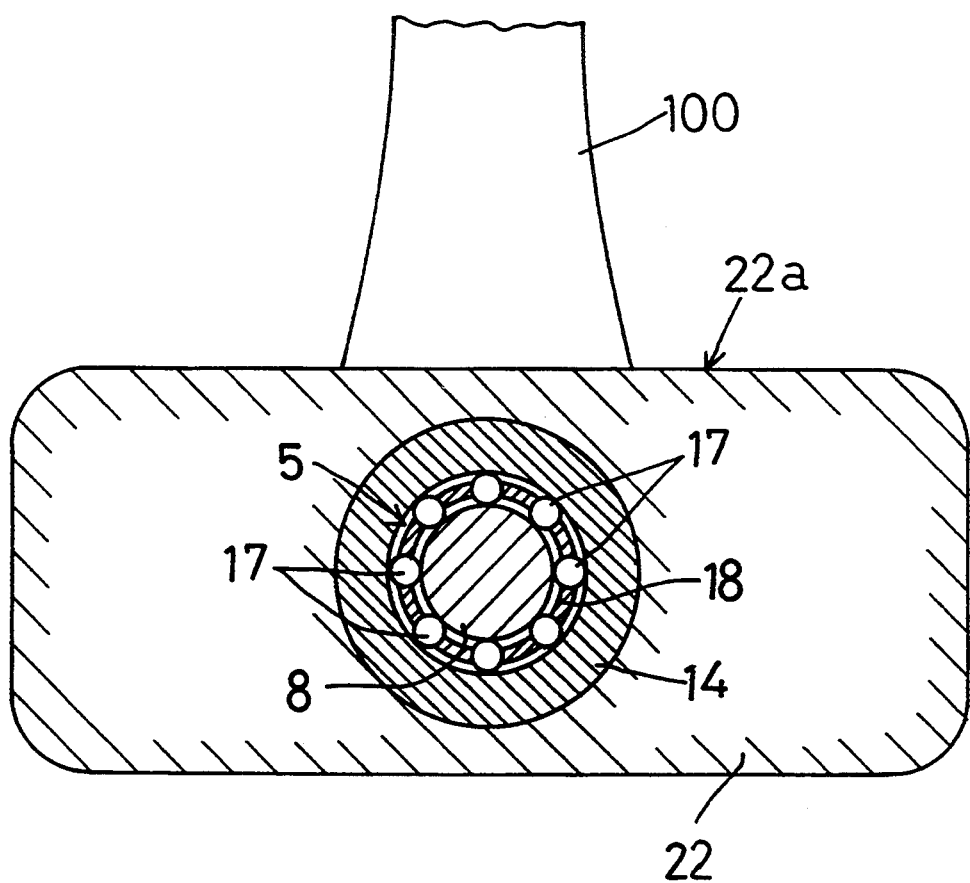
FIG. 2 is a section taken on line 2—2 of FIG. 1.

More particularly, the shank portion 1b is constricted stagewise within a range to withstand a maximum bending moment applied by cyclist's treading action. The small diameter region has a pair of first and second ball bearings 3 and 4, and a needle bearing 5 disposed adjacent thereto, for rotatably supporting the pedal body 20. That is, the shank portion 1b has a proximal portion 6 adjacent the crank arm 100 and, formed successively forwardly or outwardly therefrom, a first intermediate small diameter portion 7, a second intermediate small diameter portion 8, and a minimum diameter portion 9 to constitute the small diameter region. The first intermediate small diameter portion 7 defines an outwardly oriented race 10 of the first ball bearing 3. The minimum diameter portion 9 is threaded to have a ball presser 12 screwed thereto and having an inwardly oriented race 11 of the second ball bearing 4. The ball presser 12 is fixed in place by a lock nut 13. An outer bearing member 14 extends radially outwardly of the first intermediate small diameter portion 7, second intermediate small diameter portion 8 and minimum diameter portion 9. The outer bearing member 14 defines, at an end thereof opposed to the crank arm 100, an inwardly oriented race 15 of the first ball bearing 3 opposed to the outwardly oriented race 10. The outer bearing member 14 defines, at the other end thereof, an outwardly oriented race 16 of the second ball bearing 4 opposed to the inwardly oriented race 11. The needle bearing 5 is disposed between the first ball bearing 3 and second ball bearing 4 and between an outer periphery of the second intermediate small diameter portion 8 and an inner periphery of the outer bearing member 14. As shown in FIG. 2, the needle bearing 5 includes a plurality of needles 17 arranged at intervals circumferentially thereof, with spacers 18 mounted between adjacent pairs of the needles 17 to constantly maintain fixed intervals therebetween.

The pedal body 20 is formed of plastic and has a two-part construction including a first member 21 fitted on a region of the pedal shaft 1 adjacent the crank arm 100, and a second member 22 extending axially outwardly of the pedal shaft 1, partly overlapping the first member 21 and surrounding the distal region of the pedal shaft 1. The second member 22 is fitted on an outer periphery of the outer bearing member 14. The tread 22a is defined on an outer surface of the second member 22. Alternatively, the pedal body 20 may be formed of a metal and may be split into two, upper and lower, parts.

Thus, the pedal body 20 is rotatably supported on the pedal shaft 1 through the pair of first and second ball bearings 3 and 4 and the needle bearing 5 arranged in the distal region of the pedal shaft 1. A large part of the load resulting from pedaling action is borne by the needle bearing 5. The pedal body 20 is prevented from moving inwardly relative to the pedal shaft 1 by the first ball bearing 3, and from moving outwardly by the second ball bearing 4.

Figure 3:
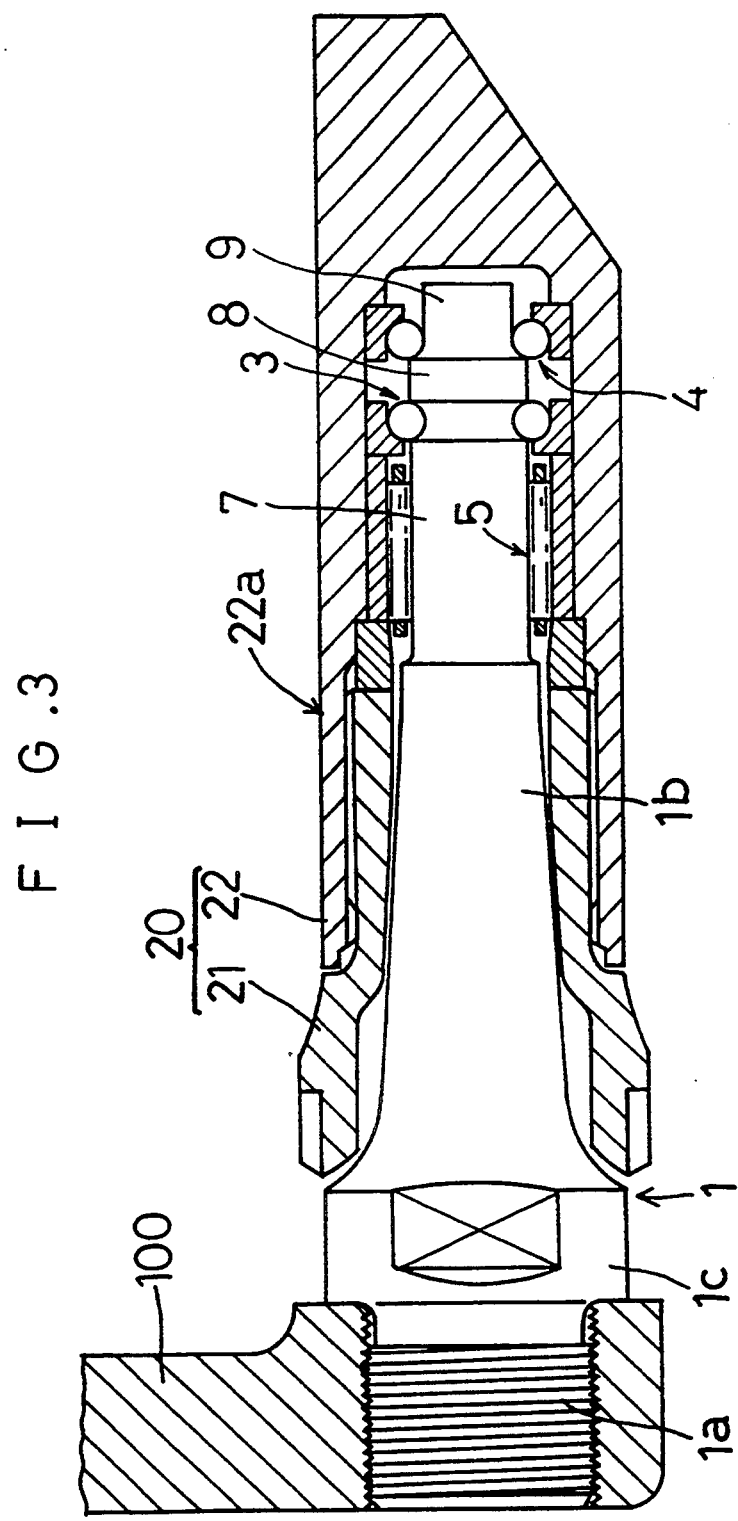
FIG. 3 is a sectional view of a bicycle pedal in a second embodiment of the invention.

FIG. 3 shows a second embodiment in which a pair of ball bearings 3 and 4 are arranged in a distal region of the pedal shaft 1, and a needle bearing 5 is disposed in a region thereof closer to the crank arm 100. In FIG. 3, like reference numerals are used to identify like parts in FIG. 1 to avoid unnecessary repetition of the description.

Figure 4:
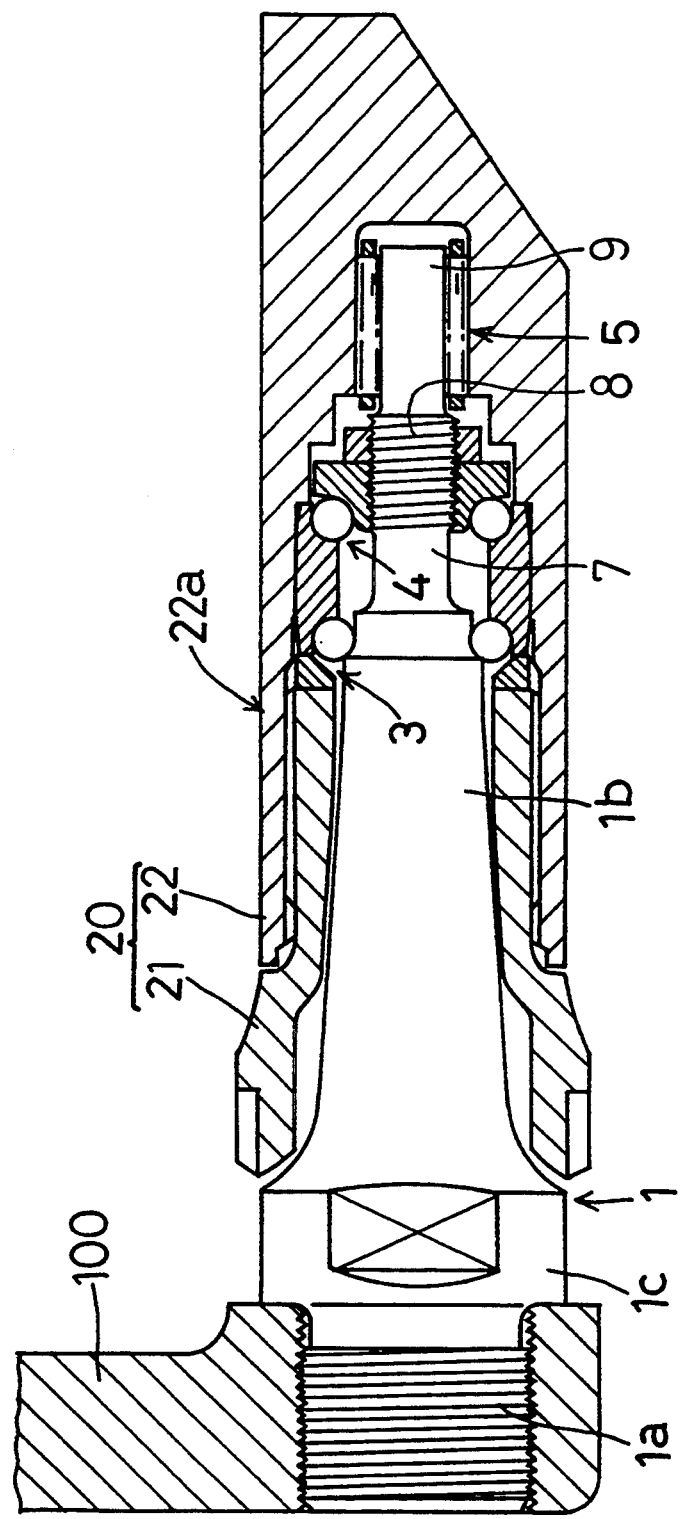
FIG. 4 is a sectional view of a bicycle pedal in a third embodiment of the invention.

FIG. 4 shows a third embodiment in which a needle bearing 5 is disposed on an extreme end of the pedal shaft 1, with a pair of ball bearings 3 and 4 arranged in a region thereof closer to the crank arm 100. Here again, like reference numerals are used to identify like parts in FIG. 1 to avoid unnecessary repetition of the description.

What is claimed is:

1. A bicycle pedal adapted to be attached to a crank arm comprising:

a pedal shaft having an attachment portion formed at one end thereof for attachment to the crank arm, said pedal shaft defining an elongated proximal portion adjacent said attachment portion and a small diameter portion formed adjacent the other end thereof and having a smaller diameter than said attachment portion;

a first and second ball bearings arranged in a region of said small diameter portion and spaced apart from each other axially of said pedal shaft for supporting a tread surface in a radial direction of said pedal shaft;

a needle bearing disposed in said region of said small diameter portion, wherein said needle bearing is disposed between said first ball bearing and said second ball bearing; and a pedal body rotatably supported on said small diameter portion through said first and second ball bearings and said needle bearing, said pedal body defining said tread surface on a surface thereof.

2. A bicycle pedal adapted to be attached to a crank arm comprising:

a pedal shaft having an attachment portion formed at one end thereof for attachment to the crank arm, said pedal shaft defining an elongated proximal portion adjacent said attachment portion and a small diameter portion formed adjacent the other end thereof and having a smaller diameter than said attachment portion;

a first and second ball bearings arranged in a region of said small diameter portion and spaced apart from each other axially of said pedal shaft;

a needle bearing disposed between said first ball bearing and said second ball bearing, a pedal body rotatably supported on said small diameter portion through said first and second ball bearings and said needle bearing, said pedal body including:

a first member surrounding a region of said pedal shaft adjacent said crank arm;

a second member extending axially outwardly of said pedal shaft and surrounding at least part of said first member; and at least one tread defined on said second member.

3. A bicycle pedal adapted to be attached to a crank arm comprising:

a pedal shaft having an attachment portion formed at one end thereof for attachment to the crank arm, said pedal shaft defining an elongated proximal portion adjacent said attachment portion and a small diameter portion formed adjacent the other end thereof and having a smaller diameter than said attachment portion;

a first and second ball bearings arranged in a region of said small diameter portion and spaced apart from each other axially of said pedal shaft;

a needle bearing disposed between said first ball bearing and said second ball bearing;

a pedal body rotatably supported on said small diameter portion through said first and second ball bearings and said needle bearing, said pedal body including:

a first member surrounding a region of said pedal shaft adjacent said crank arm;

a second member extending axially outwardly of said pedal shaft and surrounding at least part of said first member;

at least one tread defined on said second member;

wherein said needle bearing and said first and second ball bearings are disposed between said second member and said small diameter portion.

* * * * *